United States Patent [19]
Darrow

[11] 3,737,806
[45] June 5, 1973

[54] FAIL-SAFE CIRCUIT ARRANGEMENTS

[75] Inventor: John O. G. Darrow, Murrysville, Pa.

[73] Assignee: Westinghouse Air Brake Company, Swissvale, Pa.

[22] Filed: Jan. 12, 1970

[21] Appl. No.: 1,970

Related U.S. Application Data

[63] Continuation of Ser. No. 706,914, Feb. 20, 1968, abandoned.

[52] U.S. Cl. ............331/117 R, 331/108 B, 331/172
[51] Int. Cl. ................................................H03b 5/12
[58] Field of Search.,....................331/117, 109, 172, 331/108; 307/318; 318/146, 148.5, 285

[56] References Cited
UNITED STATES PATENTS

| | | |
|---|---|---|
| 2,905,835 | 9/1959 | Wray....................................331/117 |
| 3,327,234 | 6/1967 | Grenier................................331/117 |
| 3,422,415 | 1/1969 | Ichimori..............................331/117 |

Primary Examiner—John Kominski
Attorney—W. L. Stout and John B. Sotak

[57] ABSTRACT

A fail-safe level detector comprising a regenerative feedback oscillator and a voltage breakdown device interconnecting the output and common electrodes of the oscillator so that sufficient feedback for sustaining oscillations only occurs when a D.C. input causes the breakdown device to conduct and to assume its low dynamic impedance condition.

1 Claim, 2 Drawing Figures

INVENTOR
John O. G. Durrow
BY
W L Stout
HIS ATTORNEY

FAIL-SAFE CIRCUIT ARRANGEMENTS

The present application is a streamlined continuation of application Ser. No. 706,914, filed Feb. 20, 1968, and now abandoned.

My invention relates to fail-safe level detectors and more particularly to fail-safe circuit arrangements employing a feedback oscillator and the voltage and dynamic impedance characteristics of a breakdown device for providing an A.C. output when and only when the amplitude of a D.C. input exceeds a predetermined value.

In various automatic control systems safety is of catastrophic importance. For example, in vehicle speed detection arrangements for mass and/or rapid transit operations, it is mandatory to determine the actual speed of a moving vehicle and thereafter to compare the actual speed with the prescribed speed command request for a given area or section in order to prevent injury to individuals and damage to equipment. That is, in such systems, it is a peremptory safety requirement that under no circumstances should the actual speed of the moving vehicle exceed the preselected speed command request for any given area. In one particular arrangement, the actual speed of a moving vehicle is derived by suitable speed sensing apparatus, such as an axle driven frequency generator which delivers A.C. signals having a frequency directly proportional to the vehicular velocity. These A.C. signals obtained from the frequency generator are, in turn, applied to a suitable voltage limiter which prevents an excess voltage swing in either direction and provides that the signal amplitudes will be substantially constant. These limited signals are, in turn, applied to a suitable fail-safe low-pass filter which is selectively chosen to have an upper frequency limit corresponding to speed command request for the particular area. Accordingly, the filter will only pass signals having frequencies below the upper frequency level. It will be appreciated that as the vehicle moves from one area to the next, the upper frequency limit may be automatically controlled by varying the filter components and their values or by selecting one of a plurality of low-pass filter circuits in accordance with the prescribed command request for each given area. The A.C. output signals taken from the low-pass filter may, in turn, be converted by a fail-safe rectifier to provide a D.C. output voltage which is proportional thereto. Accordingly, if it is desired to insure that a vehicle is proceeding at a speed below some preselected value, it is merely necessary to measure the amplitude of the D.C. output signals supplied by the rectifier. However, as in all vital portions of such speed command control systems, this measuring function must be performed by fail-safe apparatus which will not provide an output signal when the vehicle is moving in excess of the preselected command request. That is, it is of the utmost importance to exercise extreme care in designing and constructing this portion of the apparatus in order to maintain the security and integrity of the overall system. Accordingly, it is readily evident that the detecting apparatus must operate in a fail-safe manner so that any conceivable and foreseeable failure will result in a condition as least as restrictive and preferably more restrictive than that proceeding the failure. For example, in such apparatus a circuit malfunction or component failure should not be permitted to erroneously simulate or indicate a condition for holding or maintaining the vehicle's speed, and normally, it is preferred that the failure should either provide a warning such as flashing a light, sounding a buzzer, or initiate a braking action for stopping the vehicle. Thus, in order to insure a higher degree of safety to individuals as well as apparatus, it is necessary and essential that under no circumstances will a failure cause or be capable of simulating a true or valid speed indication.

Accordingly, it is an object of my invention to provide a new and improved fail-safe circuit arrangement.

A further object of my invention is to provide a unique amplitude level detector circuit which operates in a fail-safe manner.

Another object of my invention is to provide an improved semiconductive circuit arrangement which will provide an output when and only when the amplitude of an input exceeds a predetermined value.

Yet another object of my invention is to provide a new fail-safe level detector for measuring the amplitude of an input and only producing an output when the amplitude of the input exceeds a predetermined level.

Still another object of my invention is to provide a fail-safe circuit arrangement for measuring a D.C. input and for providing an A.C. output when and only when the amplitude of the D.C. input exceeds the preselected value.

Still yet another object of my invention is to provide a fail-safe amplitude level detector employing the dynamic impedance characteristics of a breakdown device for controlling the conductive condition of a regenerative circuit.

Still yet a further object of my invention is to provide a transistorized level detector which operates in a fail-safe manner to produce an output when and only when an input exceeds a predetermined level.

A still further object of my invention is to provide a feedback type of oscillator which is only capable of sustaining oscillations when an input causes a voltage device to breakdown and assume its low dynamic impedance condition.

Yet still another object of my invention is to provide a fail-safe circuit arrangement which is simple in construction, economical in cost, efficient and reliable in operation.

Briefly, the fail-safe level detector of the present invention employs a feedback type of oscillator circuit and a voltage breakdown device. The oscillator includes a transistor amplifier and a frequency determining circuit. The frequency determining circuit is interconnected by the voltage breakdown device to the transistor amplifier for controlling the amount of regenerative feedback and in turn the oscillating condition of the oscillator. Normally, the voltage breakdown device exhibits a high dynamic impedance and only assumes a low dynamic impedance condition when a sufficient D.C. voltage causes the device to breakdown and conduct. Accordingly, the oscillator will only sustain A.C. oscillations when a D.C. voltage exceeds a predetermined amplitude for causing the breakdown device to conduit and assume its low impedance condition so that sufficient regenerative feedback is provided from the output to the input of the oscillator.

In accordance with one embodiment of the invention, the fail-safe level detector employs a Colpitts type of oscillator.

In accordance with another embodiment of the present invention, the fail-safe level detector utilizes an RC phase-shift oscillator.

The foregoing objects and other attendant features and advantages will be more readily appreciated as the subject invention becomes better understood by reference to the following detailed description when considered in conjunction with the accompanying drawings wherein.

As is well known, a feedback type of oscillator may be defined as a tuned feedback amplifier in which the amplitude and phase angle of the feedback signal are such as to cause sustained oscillation. That is, the feedback signal must be in phase with the input and must be of sufficient magnitude to overcome the normal circuit losses in order to sustain the oscillations. In oscillating circuits of this type, it is conventional practice to connect the frequency determining circuit between the input and output electrodes of the amplifier and also to connect the frequency determining circuit to the common electrode of the amplifier. As will be described in greater detail hereinafter, by controlling the impedance characteristic of the common electrode connection, the amount of regenerative feedback and in turn the given losses therein may be employed to control the conductive condition of the amplifier. That is, a high value of impedance appearing in the common connection will proportionally increase the negative or degenerative feedback which therefore materially reduces the gain of the amplifier thereby effectively dampening the oscillations of the oscillator. The present invention makes use of this operating principle in a unique manner wherein the condition of an oscillator is effectively controlled and an A.C. output is only available when the magnitude of a D.C. input exceeds a predetermined value.

Figure 1:
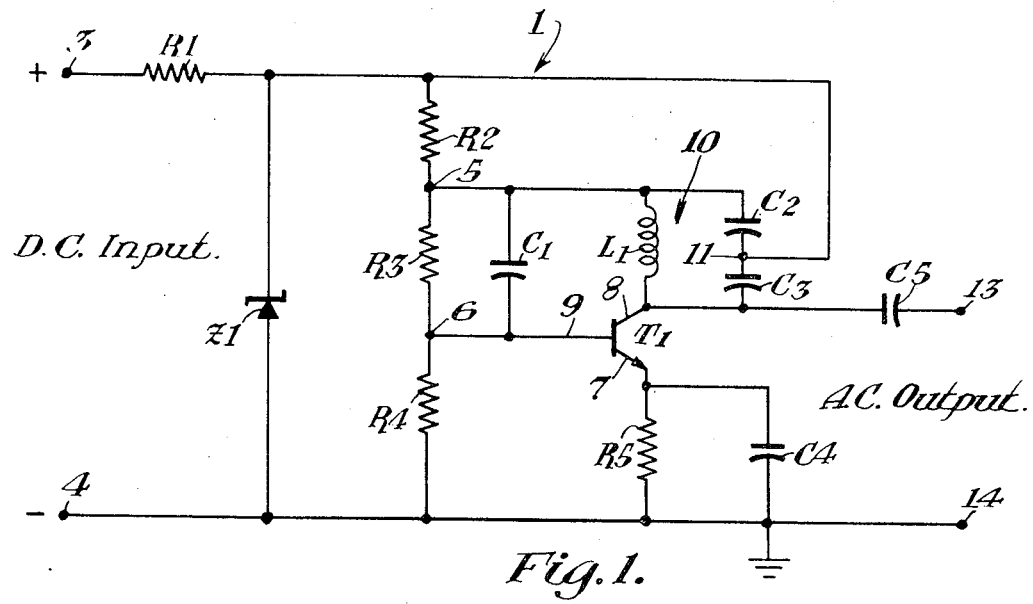
FIG. 1 is a schematic circuit diagram of a fail-safe level detector in accordance with the present invention wherein the oscillator comprises a Colpitts type of oscillator.

Referring now to the drawings and in particular to FIG. 1, there is shown a fail-safe amplitude level detector characterized by the numeral 1. As previously mentioned, the amplitude voltage level detector 1 operates in a fail-safe manner to measure the amplitude of a D.C. input voltage which is representative of the actual speed of the moving vehicle. That is, the D.C. voltage supplied by the speed sensing apparatus is applied to the input terminals 3 and 4. As shown, a current limiting resistor R1 has one of its ends connected to the input terminal 3 and the other end connected to the cathode of the Zener diode Z1. The anode of the Zener diode Z1 is connected to the other input terminal 4 which is appropriately grounded thereby forming a common terminal. The resistor R1 and Zener diode Z1 form a voltage regulator which stabilizes and provides a substantially constant operating and biasing supply voltage for improved operation. In addition to its voltage regulating feature, the voltage breakdown device or Zener diode also exhibits the unique characteristics of having a high dynamic impedance condition when not conducting and of having a low dynamic impedance condition when rendered conductive and operating properly. As will be described in greater detail hereinafter, this unique characteristic is employed in the present invention for insuring that the level detector operates in a fail-safe manner.

A voltage dividing network consisting of series connected resistors R2, R3 and R4 is connected in parallel across the Zener diode Z1. The resistive values of the voltage dividing network are selected to provide the proper biasing potentials for the various electrodes of the transistor T1 which forms the amplifier or active element of a Colpitts oscillator. The transistor T1 includes a common emitter electrode 7, an output collector electrode 8 and an input base electrode 9. The frequency determining circuit is in the form of a parallel tuned or resonant tank circuit 10 which is tuned to a predetermined frequency and, comprises series connected capacitors C2 and C3 connected in parallel with inductor L1. As shown, one end of the tank circuit 10 is directly connected to the collector electrode 8 while the other end of the tank circuit 10 is directly connected to the junction point 5 of the voltage dividing network. The base electrode 9 is directly connected to the junction point 6 of the voltage dividing network. A signal passing capacitor C1 is connected between the junction points 5 and 6 of the voltage dividing network thereby connecting the other end of the resonant tank circuit 10 with the base electrode 9. The common point 11 of the two tuning capacitors C2 and C3 is directly connected to the upper portion of the voltage divider network and, in turn, to the cathode of the Zener diode Z1. The emitter electrode 7 is connected through resistor R5 to ground. A by-pass capacitor C4 is connected in parallel with resistor R5. The collector electrode 8 is connected through the coupling capacitor C5 to the output terminal 13. The output terminals 13 and 14 may be connected to a suitable utilization device, such as a vital type of under-speed relay after being appropriately amplified and rectified.

Turning now to the operation, it will be assumed that the moving vehicle is proceeding at or below the preselected speed command request so that the D.C. signals generated by the speed sensing apparatus and applied to the input terminals 3 and 4 are of a preselected or predetermined level. As previously mentioned, the speed sensing apparatus is only capable of generating a sufficient level of D.C. voltage when the vehicle is proceeding at a speed lower than a preselected speed command request for the particular area. The voltage breakdown characteristic of the Zener diode Z1 is appropriately selected to require a potential level substantially equal to the voltage level of the sensing apparatus when the vehicle is moving below the preselected speed command request. Accordingly, under this condition the D.C. input voltage is of the sufficient magnitude to cause the Zener diode Z1 to breakdown thereby causing the diode to conduct and exhibit a low dynamic impedance. Since the voltage across the Zener diode remains substantially constant over a wide range of voltage and current changes, the various biasing voltage supplied by the voltage dividing network insure stable operation of the transistor oscillator. With the Zener diode conducting, a low impedance path is established from the common point 11 of the tuned resonant circuit 10 to the emitter 7 of the transistor amplifier T1. This path extends from the common point 11, through the Zener diode 71, through by-pass capacitor C4 to the emitter electrode 7 of the transistor T1. Accordingly, sufficient regenerative feedback is now provided for the transistor oscillator so that oscillations occur and an A.C. output signal is present on the output terminals 13 and 14. As is well known, the A.C. output power which is available at the collector electrode 8 is a function of the amplifier gain minus the feedback power. As previously mentioned, this A.C. voltage on terminals 13 and 14 after suitable amplification and rectification may, in turn, be employed to energize underspeed relay thereby indicating that the speed of the vehicle is not in excess of the preselected command request. That is, the presence of A.C. output at the terminals 13 and 14 may be construed as a true or valid indication that the vehicle is proceeding at or below the preselected speed command request.

Let us now assume that the actual speed of the vehicle increases to a point beyond the predetermined speed command request so that the circuit operation may be analyzed under this condition. Under this condition, the axle generator now produces a signal of increased frequency. These higher frequency signals are greatly attenuated due to the inherent rejection characteristics of the low-pass filter, so that the D.C. output produced by the rectifier network is proportionally reduced at this time. Accordingly, the level of D.C. input voltage applied to terminals 3 and 4 is substantially below the "Zener" threshold or breakdown voltage of the diode Z1. Now with an insufficient magnitude of D.C. voltage applied across the Zener diode Z1, the diode will not conduct and will exhibit a high dynamic impedance. In view of the high impedance condition of the Zener diode Z1, the feedback path from the junction point 11 of the tank circuit 10 to the emitter 7 of transistor T1 will appear as an open circuit and therefore the oscillator will not oscillate. In practice, the impedance of resistor R1 is chosen to be relatively high so that sufficient regenerative feedback cannot occur through the speed sensing apparatus. Accordingly, under this condition no A.C. output is available at the terminals 13 and 14, and therefore the under-speed relay becomes deenergized thereby signifying that the vehicle is now proceeding at the speed above the preselected speed command request for the given area. The deenergization of the under-speed relay may, in turn, cause the energization of a suitable alarm, such as lighting a lamp or sounding a buzzer, or may initiate an automatic braking action to slow down or stop the vehicle entirely.

As previously mentioned, the amplitude level detector must operate in a fail-safe manner so that no conceivable component or circuit failure will be capable of producing an A.C. output on the output terminals 13 and 14 at this time. It will be noted that if the Zener diode becomes short-circuited, the necessary biasing or supply voltages are not available and therefore the oscillator is incapable of oscillating. If the Zener diode becomes open-circuited, it is quite apparent that the required low impedance path between the junction point 11 and emitter 7 is not present so that oscillations cannot occur and no A.C. signal is again available at the output terminals 13 and 14. If the Zener diode becomes leaky and conducts at some voltage lower than the normal breakdown voltage, the dynamic impedance exhibited by the diode is still generally sufficient to cause an appreciable amount of degeneration so that oscillations will not occur. An open-circuit failure of the current limiting resistor R1 is obviously a safe condition. Normally, fail-safeness is based on the premise that resistors or resistive elements cannot become short-circuited due to the particular type of resistors, namely, carbon-composition, employed in circuits which must operate in a fail-safe manner. It will be noted that the various other components and elements constituting the oscillator circuit will either fail in a safe manner or destroy the circuit integrity to the point where oscillations will not occur. Accordingly, it will be observed that the presently described level detector operates in a fail-safe manner so that an A.C. output is available at the output terminals 13 and 14 when and only when a predetermined value of D.C. input is applied to the input terminals 3 and 4.

Figure 2:
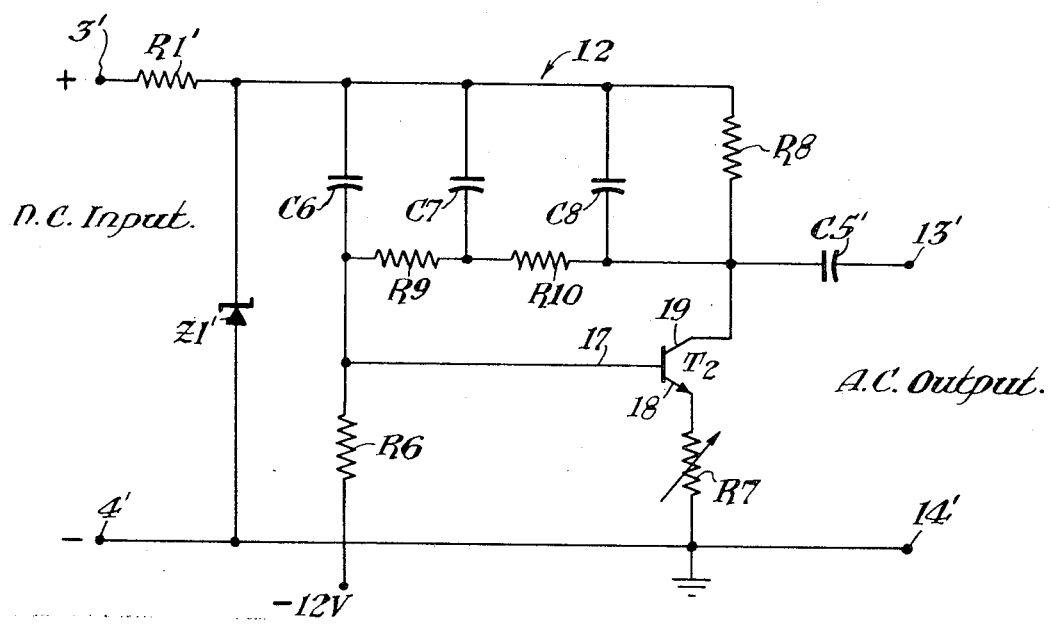
FIG. 2 is a schematic diagram of a fail-safe level detector in accordance with the present invention wherein the oscillator comprises an RC phase-shift oscillator.

Referring now to FIG. 2, there is shown an alternative embodiment of a fail-safe level detector employing the inventive concept advanced herein. The circuit of FIG. 2 is in general similar to that of FIG. 1, and similar components have been designated by primed numerals. In this embodiment the fail-safe level detector which is characterized by numeral 12 is slightly different from the detector of FIG. 1 in that an RC phase-shift oscillator is employed as the oscillating circuit. As in FIG. 1 the output from the speed sensing apparatus is connected to the terminals 3' and 4', respectively. The input terminals 3' is coupled to one end of the carbon composition type of current limiting resistor R1' similar to that of FIG. 1. The other end of resistor R1' is connected to the cathode of Zener diode Z1' whose anode is connected to the input terminal 4. The phase-shift oscillator includes an amplifying device such as transistor T2 having an input base electrode 17, a common emitter electrode 18, and an output collector electrode 19. The base electrode 17 is connected to the negative 12 volt terminal of a suitable source of biasing potential by resistor R6. The emitter electrode 18 is connected to the common terminal or ground through a potentiometer or adjustable resistor R7 which may be selectively varied to control the necessary gain of the amplifier. The collector 19 is connected through load resistor R8 to the cathode of the Zener diode Z1. In order to provide the necessary 180° phase shift which is required for the common-emitter configuration, an RC phase shift or frequency of oscillation determining network is employed for making the feedback signal positive when returned from output to input. The resistance capacitance phase-shifting network consists of three sections, each contributing approximately a 60° phase shift at the frequency of oscillation. The three sections consist of $C_6R_9$, $C_7R_{10}$ and $C_8$ and the effective resistive impedance driving which in effect is resistance R8. As shown, the junction of capacitor $C_6$ and $R_9$ is directly connected to the base electrode 17 while the other side of capacitor $C_6$ is directly connected to the cathode of Zener diode Z1'. The output terminals 13' and 14' are connected to the collector electrode 19 by coupling capacitor C5' and to ground, respectively.

The function and operation of the amplitude level detector of FIG. 2 are substantially identical to that of FIG. 1 in that the phase shift oscillator can only produce oscillations when the Zener diode Z1' conducts and exhibits a low dynamic impedance condition. That is, a low impedance feedback path is established from the common junction of capacitors $C_6$, $C_7$ and $C_8$ to the emitter 18 of transistor T2 under this condition. However, when the D.C. voltage applied to terminals 3' and 4' is insufficient to breakdown the Zener diode, the oscillator will not oscillate and deliver an A.C. output on terminals 13' and 14' due to the high impedance presented by Zener diode Z1'. The signal voltage developed across the high impedance of the Zener diode Z1' causes degenerative feedback to occur so that the gain of the amplifier is reduced and hence oscillations will not occur. As previously mentioned, the unique characteristics of the Zener diode Z1' also prevent oscillations from occuring when the diode becomes short-circuited or open-circuited due to either the absence of the necessary biasing and operating voltages or the interruption of the A.C. feedback connection, respectively. As previously mentioned, a leaky Zener diode fails in a safe manner in that a relatively high dynamic impedance accompanies a conducting Zener diode which avalanches at a reduced voltage level.

Accordingly, an A.C. output is only available at terminals 13' and 14' when the applied D.C. voltage on terminals 3' and 4' is of a sufficient magnitude to cause the Zener diode Z1' to become conductive and assume its low dynamic impedance condition. Then and only then will the feedback signal be in phase with the input and the amplifier gain be sufficient to overcome the feedback losses so that the oscillator will sustain oscillations and supply an A.C. output signal of the selected frequency on the terminals 13' and 14'. As previously mentioned, the output taken from terminals 13' and 14' may be employed to energize an under-speed relay in an automatic speed control system or alternately may be utilized to supply switches, gates or other elements in various logic circuits.

Accordingly, it will be noted that each of the above described fail-safe amplitude level detectors functions and operates in a fail-safe manner to produce an A.C. output when and only when the magnitude of a D.C. input exceeds a preselected value.

Further, it may be mentioned the circuit parameters of each of the described detectors have been selected to preferably employ a Zener diode having a "threshold" or breakdown voltage in the range of 6 to 8 volts in that no presently known diode in this range can conduct at a lower than rated Zener voltage and yet exhibit a low dynamic impedance. However, it is readily understood that Zener diodes having other voltage Zener ratings may equally well be employed when it is possible to positively insure that when the diode breaks down at a lower than its rated Zener voltage, it will not exhibit a low impedance condition.

Also it will be appreciated that while the present invention has been described in terms of Zener diodes and transistor amplifiers, it is readily understood that other voltage stabilizing or breakdown devices such as neon glow or gas regulator tubes and that other amplifying devices such as gas or vacuum tubes may be employed with equal success.

Although common-emitter configurations and NPN transistors have been illustrated, it is understood that common-collector or common-base configurations as well as transistors of opposite conductivity, that is, PNP transistors may be used in practicing the present invention by merely reversing the polarity of the direct current input and of the Zener diode, as is well known.

In addition, it will be appreciated that while Colpitts and RC phase shift types of oscillator circuits have been illustrated in practicing the present invention, it is readily understood that various other types of oscillator circuits such as Hartley, Clapp and numerous other types of feedback oscillators may be equally used as the oscillation producing circuit. Similarly, it is readily understood that LC or RL sections may be used in place of the RC sections in the phase-shift oscillator, and that the capacitors and resistors of the phase-shift network may be interchanged with equal success.

It will also be appreciated that while this invention finds particular utility in speed control systems, it is readily evident that the invention is not merely limited thereto but may be employed in various other systems and apparatus which require the security and safety inherent in the invention. But regardless of the manner in which the invention is used, it is understood that various alterations may be made by persons skilled in the art without departing from the spirit and scope of this invention. It will also be apparent that other modifications and changes can be made in the presently described invention, and therefore it is understood that all changes and equivalents and modifications within the spirit and scope of this invention are herein meant to be included in the appended claims.

Having thus described my invention, what I claim is:

1. A fail-safe circuit arrangement comprising, an input, an output and a common terminal, a current-limiting resistor and a Zener diode electrically connected between said input and said common terminals, a voltage dividing network including a first, a second and a third resistor connected across said Zener diode, a transistor having an emitter, a collector and a base electrode, a parallel resonant tank circuit including an inductor and a pair of capacitors, said tank circuit having one end connected to said collector electrode and having other end connected to the junction point of said first and said second resistors of said voltage dividing network, a signal passing capacitor connected between the junction point of said first and said second transistors and the junction point of said second and said third resistors of said voltage dividing network, the base electrode connected to the junction point of said second and said third resistors of said voltage dividing network, a biasing resistor and a bypass capacitor connecting the emitter electrode to said common terminal, a coupling capacitor connecting the collector electrode to said output terminal, and a feedback circuit coupled from the junction of said pair of capacitors of said tank circuit through said Zener diode to the emitter electrode whereby A.C. oscillations are produced on said output terminal when and only when a D.C. voltage of sufficient amplitude is present on said input terminal to cause said Zener diode to conduct and assume a low dynamic impedance condition.

* * * * *